United States Patent
Deshpande et al.

(10) Patent No.: US 8,841,014 B1
(45) Date of Patent: Sep. 23, 2014

(54) LIQUID METAL ELECTRODES FOR RECHARGEABLE BATTERIES

(75) Inventors: Rutooj D. Deshpande, Lexington, KY (US); Juchuan Li, Lexington, KY (US); Yang-Tse Cheng, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 13/458,620

(22) Filed: Apr. 27, 2012

Related U.S. Application Data

(60) Provisional application No. 61/517,866, filed on Apr. 27, 2011.

(51) Int. Cl.
    *H01M 4/36* (2006.01)
(52) U.S. Cl.
    CPC .................................... *H01M 4/36* (2013.01)
    USPC ........................................ 429/102; 429/101
(58) Field of Classification Search
    CPC ......... H01M 4/36; H01M 4/38; H01M 4/387; H01M 4/58; H01M 4/26
    USPC ....................................................... 429/105
    See application file for complete search history.

(56) References Cited

U.S. PATENT DOCUMENTS

| | | | |
|---|---|---|---|
| 8,642,201 B2 | 2/2014 | Cheng et al. | |
| 8,658,295 B2 | 2/2014 | Cheng et al. | |
| 2010/0047671 A1* | 2/2010 | Chiang et al. | 429/50 |
| 2011/0014505 A1* | 1/2011 | Bradwell et al. | 429/51 |
| 2012/0244418 A1* | 9/2012 | Cheng et al. | 429/163 |

OTHER PUBLICATIONS

Deshpande, et al; Liquid Metal Alloys as Self-Healing Negative Electrodes for Lithium Ion Batteries, Journal of the Electrochemical Society 158(8), A845-A849 (2011).

Verbrugge, et al; The search for high cycle life, high capacity, self healing negative electrodes for lithium ion batteries and a potential solution based on lithiated gallium; Res. Soc. Symp. Proc; vol. 1333; 2011.

* cited by examiner

*Primary Examiner* — Ula C Ruddock
*Assistant Examiner* — Scott J Chmielecki
(74) *Attorney, Agent, or Firm* — Stites & Harbison PLLC; Mandy Wilson Decker

(57) ABSTRACT

An electrode for a lithium ion battery includes a liquid metal having a melting point that is below the operating temperature of the battery, which transforms from a liquid to a solid during lithiation, and wherein the liquid metal transforms from a solid to a liquid during delithiation.

14 Claims, 11 Drawing Sheets

LIQUID METAL ELECTRODES FOR RECHARGEABLE BATTERIES

RELATED APPLICATIONS

This application claims priority from U.S. Provisional Application Ser. No. 61/517,866 filed Apr. 27, 2011, the entire disclosure of which is incorporated herein by this reference.

GOVERNMENT INTEREST

This invention was made with government support under contract number CMMI #1000726 awarded by the National Science Foundation (NSF). The government has certain rights in the invention.

TECHNICAL FIELD

The presently-disclosed subject matter relates to a liquid metal electrode for a rechargeable battery having improved capacity and durability. In particular, the presently-disclosed subject matter relates to a lithium ion battery having an electrode including a liquid metal having a melting point that is below the operating temperature of the battery.

INTRODUCTION

A battery usually consists of a first and a second electrode (e.g., positive electrode and negative electrode), and a liquid electrolyte. A separator with its pores filled with electrolyte is positioned between the positive and negative electrodes, allowing the passage of ions and preventing a short circuit. While many types of batteries are commercially available, Li ion and other Li-based batteries have the highest energy density of most rechargeable batteries and they are becoming one of the most important energy storage devices for hybrid and electric vehicles [1-3].

During discharging, the negative electrode (anode) is electrochemically oxidized. This results in the release of Li ions into the electrolyte (de-lithiation). At the same time, electrons move through the external circuit and travel toward the positive electrode, providing usable energy. The Li ions travel through the electrolyte and insert into the positive electrode. When the battery is recharged, the reverse process occurs, converting electrical energy to chemical energy stored in the electrode.

Presently, there is an intense, worldwide effort toward developing durable lithium ion batteries (LIBs) with high energy and power densities for a wide range of applications. Among the many desirable attributes, fast electronic conduction and ionic transport are essential, especially for high power batteries.

In a typical LIB, the liquid electrolyte provides ionic conduction. Concurrently, electrons flow through the electrodes via a percolating conductive network consisting of active lithium storage materials and conductive particles (e.g, carbon black). However, the electronic conducting path may be broken if fracture occurs either within active materials or at the interfaces between active materials and conducting particles [1]. Furthermore, the active materials in the broken-off regions will no longer contribute to electrochemical energy storage. As the fractured area grows with the number of charge-and-discharge cycles, degradation in battery energy and power densities becomes more severe, leading to eventual failure of the battery.

Fracture of the electrodes caused by large volume changes during lithiation and de-lithiation is now recognized as one of the critical challenges facing the development of LIB technologies [1, 5]. In particular, fracture has been recognized as a major obstacle to advancing high capacity LIB negative electrodes [6-8].

Presently, metal oxides, such as $LiCoO_2$, $LiNi_{1/3}Co_{1/3}Mn_{1/3}O_2$, and $LiFePO_4$, are used for the positive electrode and carbonaceous materials such as graphite, which is capable of hosting one Li atom per six carbon atoms, are used for the negative electrode. Theoretically, materials such as Si and Sn have much higher energy capacity than graphite and are candidates for the negative electrode. However, the volume change associate with lithiation and de-lithiation in these materials can be as high as several hundred percent [1]. As a result, electrodes made of bulk Sn and Si would fracture to pieces after less than 10 cycles [6].

Fracture can also contribute to the degradation of positive electrodes. For example, Itou and Ukyo of Toyota Central R&D Labs [9] observed a significant increase in the electrical resistance in the $Li(Ni,Co)O_2$ positive electrode after cycling. They linked this increase in cell resistance with cracking and fracture of the $Li(Ni,Co)O_2$ electrode. More recently, Ito of Nissan Research Center and collaborators [10] showed that micro-cracks could cause cyclic deterioration of $Li[Ni_{0.17}Li_{0.2}Co_{0.07}Mn_{0.56}]O_2$ electrode. This material belongs to the family of $Li_2MnO_3$—$LiMO_2$ (M=Co and Ni, etc.) solid-solution electrodes which have high capacity (>200 mAh $g^{-1}$) and high voltage (4.6 V). These findings highlight the importance of mitigating fracture in both positive and negative electrodes.

Previous studies in the field that focused on improving electrode durability can be divided into three categories: (1) alloying Li-active materials with inactive elements, (2) building nanostructured electrodes, and (3) adding conducting and/or non-conducting buffer components. Alloying Li-active with inactive materials improves battery cycle life significantly, such as alloying Sn with Cu [32], Co [33], or Ni [34]. However, the total gravimetric and volumetric energy densities of the composite electrodes are lowered because the inactive elements contribute to extra weight and volume. Nanostructured electrodes, such as thin-film Si [35], Si nano particles [36], Si nanowires [12], and $TiO_2$ nanowires [37], as well as porous transition metal oxides [38, 39], show improvements in cycle life compared to their bulk-material counterparts. However, nanostructuring reduces volumetric capacity of electrodes because of the low packing density of nanowires, nanoparticles, and porous materials. Furthermore, nanostructured electrodes may suffer from increased irreversible capacity degradation due to excessive SEI formation [40] and other deleterious reactions with the electrolyte because of their high surface to volume ratio. In addition, conducting additives and chemical binders, such as carbon black and polyvinylidene fluoride (PVDF), have been shown to improve the performance of LIBs at the cost of extra mass and volume occupied by the additives and binders.

Accordingly, there remains a need in the art for LIBs having high capacity and improved durability, which satisfactorily addresses the problems associated with known LIBs.

SUMMARY

The presently-disclosed subject matter meets some or all of the above-identified needs, as will become evident to those of ordinary skill in the art after a study of information provided in this document.

This Summary describes several embodiments of the presently-disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this Summary or not. To avoid excessive repetition, this Summary does not list or suggest all possible combinations of such features.

The presently-disclosed subject matter overcomes some of the drawbacks associated with known lithium ion batteries (LIBs), particularly the critical problem of fracture in high capacity LIB electrodes. Electrodes and batteries of the presently-disclosed subject matter allow "cracks" occurring in electrode material during cycling to be "healed" by making use of a liquid metal that transforms from a solid phase to a liquid phase during delithiation. With reference to FIG. 1, a lithium-active liquid metal (LM), which melts at a temperature below the operating temperature of the battery, is used as an electrode. The LM electrode can undergo liquid-to-solid phase transformation upon lithiation as a result of the formation of high melting point intermetallics. In the solid state, the electrode may crack, just as in other solid electrodes such as Si and Sn; however, the electrode can undergo solid-to-liquid phase transformation during delithiation, returning the electrode to the initial liquid state. The cracks formed in the solid state are "self-healed" after the solid-to-liquid phase transformation.

DESCRIPTION OF EXEMPLARY EMBODIMENTS

The presently-disclosed subject matter includes electrodes, batteries, and methods of making same, which make use of a liquid metal, which transforms from a liquid to a solid during lithiation, and transforms back from a solid to a liquid during delithiation.

The idea of using liquid metals as battery electrodes at elevated temperatures (>400° C.) can be traced to at least the 1960s in the context of "Thermally Regenerative Batteries." For example, Agruss and co-workers proposed and demonstrated batteries consisting of a liquid metal anode, a molten salt electrolyte, and a liquid metal cathode [50]. Because of the high ionic conductivity and high electrode reaction rates at the liquid metal/molten salt interface, these batteries can deliver high power. Agruss and co-workers [51] have reported performance data on Na/Sn, Na/Hg, and K/Hg liquid metal concentration cells. Agruss also disclosed in a U.S. Pat. No. 3,245,836 an electrochemical power source "having a positive electrode of a molten metal selected from the group consisting of lead, tin, mercury, bismuth, cadmium, gallium, and antimony, and a negative electrode of a molten metal selected from the group consisting of sodium, potassium, rubidium, lithium, calcium, and magnesium . . . " Recently, a group of researchers at MIT described in US Patent Application Publication No. 2008/0044725 a "liquid electrode battery" consisting of three liquid material layers of positive electrode, electrolyte, and negative electrode. More recently, the group published a paper describing a high-temperature (700° C.) magnesium-antimony (Mg∥Sb) liquid metal battery comprising a negative electrode of Mg, a molten salt electrolyte ($MgCl_2$—KCl—NaCl), and a positive electrode of Sb [54]. Because these batteries operate at high temperature, the electrodes and electrolytes in these batteries remain in the liquid state during operation. Thus, although liquid metal has been employed previously for use in batteries, an electrode or a battery has not heretofore been described or suggested.

It is also noted that a conceptually different approach to self-repairing a conducting path using liquid metals has recently been proposed [48]. Quite distinctly from the presently-disclosed subject matter, this approach is based on embedding liquid metal filled microcapsules in an electrodes. If the electronic conducting path is mechanically damaged, the microcapsules burst, releasing liquid metals to fill the cracks in the electrode that exists as a solid during operation. The electronic conducting pathways can thus be repaired [49]. Again, this technology is distinct from the presently-disclosed subject matter, which make use of a liquid metal as an electrode, which transforms from a liquid to a solid during lithiation, and transforms back from a solid to a liquid during delithiation.

Figure 1:
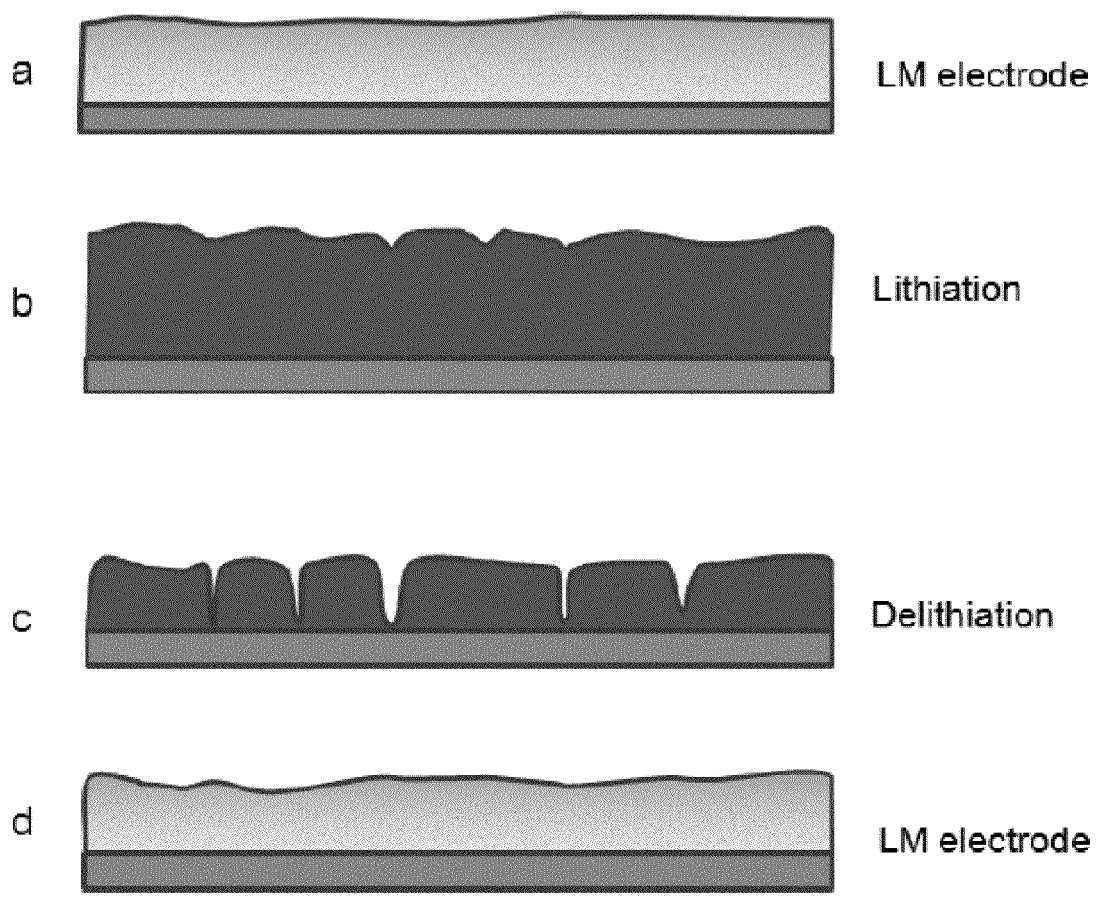
FIG. 1. Schematic of morphology changes in liquid electrode during cycling. (a) Liquid metal electrode on a solid substrate before electrochemical cycling. (b) Liquid solidifies and expands during lithiation. (c) Cracking occurs in solid mainly during delithiation. (d) Electrode returns to the liquid state during delithiation. Cracks are self-healed by the solid-to-liquid phase transformation.

This unite solid-liquid transformation of the liquid metal electrode of the presently-disclosed subject matter allows for unexpected improved capacity and durability. One important problem that is addressed is that of fracture in high capacity LIB electrodes. Electrodes and batteries of the presently-disclosed subject matter allow "cracks" occurring in electrode material during cycling to be "healed" as the liquid metal transforms from a solid phase to a liquid phase during delithiation. With reference to FIG. 1, a lithium-active liquid metal (LM), which melts at a temperature below the operating temperature of the battery, is used as an electrode. The LM electrode can undergo liquid-to-solid phase transformation upon lithiation as a result of the formation of high melting point intermetallics. In the solid state, the electrode may crack, just as in other solid electrodes previously described; however, the electrode of the presently-disclosed subject matter can undergo solid-to-liquid phase transformation during delithiation, returning the electrode to the initial liquid state. The cracks formed in the solid state are "self-healed" after the solid-to-liquid phase transformation.

The presently-disclosed subject matter includes a battery, which includes a first electrode, and a second electrode, one of said electrodes comprising a liquid metal, wherein the liquid metal transforms from a liquid to a solid during lithiation, and wherein the liquid metal transforms from a solid to a liquid during delithiation.

The electrode comprised of the liquid metal can be either a positive electrode or a negative electrode. When the liquid metal electrode serves as the positive electrode, the electrode metal transforms from a liquid to a solid when during discharge, and from a solid to a liquid during charge. When the liquid metal electrode serves as a negative electrode, the electrode metal transforms from a liquid to a solid during charge, and from a solid to a liquid during discharge. In some embodiments, both the first and the second electrodes are comprised of liquid metal, e.g., both the positive and negative electrodes can include liquid metal.

As used herein, "liquid metal" refers to a metal that has a melting temperature that is below the operating temperature of the battery and which is capable of lithium insertion/hosting lithium atoms. The term liquid metal is inclusive of alloys. In some embodiments, the melting temperature that is below the operating temperature of the battery is about 40, 35, 30, 25, 20, 15, 10, 5, 0, −5, −10, −15, −20, or −25° C. Examples of liquid metals include, but are not limited to, gallium and alloys of gallium, indium, and/or tin. Specific examples of liquid metals include, but are not limited to, those set forth in Table 1.

TABLE 1

Examples of liquid metals and their melting points

| Composition (wt. %) | Melting point (° C.) |
|---|---|
| Ga | 29.8 |
| $Ga_{75}In_{25}$ | 15.7 |
| $Ga_{68.5}In_{21.5}Sn_{10}$ (galinstan) | −19 |

In addition to their low melting points, in some embodiments, liquid metals of particular interest have several attractive properties that are important to self-healing electrode applications, such as: (1) electrically conducting in both the solid and liquid state (e.g., liquid GaIn has a resistivity of $29.4 \times 10^{-6}$ Ω·cm compared to $17 \times 10^{-7}$ Ω·cm for copper); (2) low vapor pressure; and (3) non-flammable and low toxicity, such as metals that have been used as replacements for Hg and Pb in other applications, e.g., indium has been used in dental fillings and Ga is a trace nutrient; indium, and Sn are used in Pb-free solders in the semiconductor industry.

Many elements, such as Sn, In, and Ga, react with Li to form binary alloys [1]. These alloys, denoted by $Li_yM$ (where M is, for example, Sn, In, or Ga), have high Li:M ratios (e.g., 2<y<4.4). They have theoretical capacities much greater than that of carbon electrodes since the latter typically require six carbon atoms to host each Li atom, i.e., $LiC_6$, which corresponds to a charge capacity of 372 mAh $g^{-1}$ [1]. In contrast, Sn has high theoretical gravimetric 993 mAh g and volumetric 7262 mAh $cm^{-3}$ capacities [1, 7]. The $Li_yM$ alloys also have a plateau potential close to that of $Li/Li^+$ [1]. $Li_yM$ alloys have, therefore, been considered as negative electrodes for LIB applications. However, cracking caused by the very large volume change has severely limited the use of $Li_yM$ alloy electrodes in practice [1, 8]. By forming liquid metals using these elements, the presently-disclosed subject matter achieves high energy and power density, as well as long cycle life by a self-healing mechanism. Furthermore, the liquid metal electrodes of the presently-disclosed subject matter provide self-healing ability in composite electrodes, though their high energy storage capacity is of secondary benefit.

As noted hereinbelow, electrodes of the presently-disclosed subject matter can be made using powders of liquid metals. In some embodiments, an electrode comprising a liquid metal can further include small amounts (e.g., about 1-5% weight) of materials such as conducting additives and binders. Conducting additives and binders commonly used in the battery arts will be useful in this regard, and will be known to those of ordinary skill in the art.

In some embodiments of the presently-disclosed subject matter, the liquid metal can be mixed with an additional electrode material. Electrodes comprising a liquid metal mixed with another electrode material are sometimes referred to herein as composite electrodes. Such composite electrodes can include a liquid metal and either a high capacity positive electrode (cathode) or negative electrode (anode) material. When the electrode material fractures during cycling, as the liquid metal component transforms from a solid to a liquid during delithiation, it infiltratrates the cracks and re-establishes both electronic and lithium conduction paths. Because liquid metals can also store lithium and there is no need of additional binders or conductive particles, the composite electrodes have both high gravimetric and volumetric energy densities, as well as self-healing capability.

The liquid-metal based composite electrodes can be made by mixing the liquid metal and other electrode materials, including new materials and conventional materials, as will be known to those of ordinary skill in the art. Examples of liquid metals are included in Table 1, above. Materials that can be mixed with the liquid metal to make composite electrodes include, but are not limited to, those set forth in Table 2.

TABLE 2

Examples of materials with which liquid metals can be mixed

| Negative Electrode (anodes) | Positive Electrode (cathodes) |
|---|---|
| graphite, carbon, carbon nanotubes, carbon nanoribbons, silicon (Si), tin (Sn), germanium (Ge), titania ($TiO_2$), aluminum (Al), tin oxides ($SnO_x$), amorphous alloys (e.g., Sn—Fe—C). | Layer-structured cathode materials (e.g., $LiCoO_2$, $Li(Ni_{1/3}Co_{1/3}Mn_{1/3})O_2$), Olivine-structured cathode materials (e.g., $LiFePO_4$, $LiFeSiO_4$), Spinel-structured materials (e.g., such as $LiMn_2O_4$). |

In some embodiments, a composite electrode for use as a negative electrode is desired. In some embodiments the electrode comprises a liquid metal mixed with an additional electrode material selected from: graphite, carbon, carbon nanotubes, carbon nanoribbons, silicon (Si), tin (Sn), germanium (Ge), titania ($TiO_2$), aluminum (Al), tin oxides, and amorphous alloys. In some embodiments, the additional electrode material is silicon.

In some embodiments, a composite electrode for use as a positive electrode is desired. In some embodiments the electrode comprises a liquid metal mixed with an additional electrode material selected from: a layer-structure cathode material, an olivine-structured cathode material, and a spinel-structured material. In some embodiments, the additional electrode material is selected from $LiCoO_2$, $Li(Ni_{1/3}Co_{1/3}Mn_{1/3})O_2$, $LiFePO_4$, $LiFeSiO_4$, and $LiMn_2O_4$.

In some embodiments, an electrode includes a liquid metal (or liquid metal and additional electrode material, in the case of a composite electrode) that is provided in a film on a conductor. As further described below, a powder of the liquid metal, which can further include small amounts of conducting additives and/or binders if desired, is provided in a film on the conductor. Once the electrode is made, under a temperature that is slightly above the melting point of the liquid metal, the original solid liquid metal powder in the electrode will form a network of liquid metal, or in the macroscopic view, the liquid metal will be a film.

Without wishing to be bound by theory or mechanism, it is believed that the thickness of the film can be important. As will be recognized by one of ordinary skill in the art, the desired thickness of the film can vary, depending on the particular liquid metal that is selected. Such desired thickness can be determined by one skilled in the art, upon study of the present application, using only routine experimentation. In some embodiments, the thickness of the film can be about 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, or 950 nm. In some embodiments, the thickness of the film can be about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, or 125 µm. In some embodiments, the thickness of the film can be about 100 nm-100 µm. In some embodiments, the thickness of the film can be about 100 nm-20 µm. In some embodiments, the thickness of the film can be about 20 µm-100 µm. In some embodiments, the thickness of the film can be about 50-100 µm. In some embodiments, the thickness of the film can be about 65 µm. In embodiments wherein the electrode comprises a liquid metal and another electrode material (composite) it can be desirable in some embodiments, to have thickness closer to the higher end of the foregoing ranges, e.g. about 100 µm.

By way of providing an example, an electrode of the presently-disclosed subject matter can be provided in a coin cell battery. The liquid metal electrode can include a gallium alloy provided in a film on a stainless steel conductor. The other electrode can be lithium metal (e.g., foil). The coin cell battery can include a separator soaked in an electrolyte solution of $LiPF_6$ dissolved in ethyl carbonate and dimethyl carbonate.

In some embodiments, the liquid metal electrode can be provided in a container. In some embodiments, the other electrode is also provided in the container, and an electrolyte is provided in a space between the first and second electrodes. By way of provided an example, the liquid metal electrode can include a gallium alloy provided in a container (e.g., filled through a first opening on one side of the container). Lithium metal can serve as the other electrode, and can be provided in the container (e.g., pushed through a second opening on the other side of the container). An electrolyte solution can fill the space between.

The presently-disclosed subject matter includes methods of making electrodes and batteries of the presently-disclosed subject matter. In some embodiments, a method of making an electrode for a lithium ion battery includes lowering a liquid metal to a temperature at which the liquid metal is a solid; milling the liquid metal into a powder; and placing a layer of the liquid metal powder on a conductor.

As will be recognized by one of ordinary skill in the art, the temperature that is sufficiently low to allow for milling will differ, depending on the liquid metal that is selected (e.g., melting point) and whether additives, binding agents, and/or additional electrode materials (composite electrode) are being used. It is generally desirable for the liquid metal to be lowered to a temperature at which it is a brittle solid such that it can be crushed into a fine powder with a milling shaft. Such a temperature is often below 0° C., and can be in the range of 77-273 K. The particle size of the liquid metal powder can controlled with the milling speed and time. Fine particles can be selected using sieves and shakers.

In some embodiments, the method further includes placing a layer of the liquid metal powder on a conductor or current collector. In other embodiments, the method can include placing the liquid metal powder in a container.

In some embodiments, the method further includes heating the liquid metal powder to about the melting point of the liquid metal. This can be accomplished, for example, by heating the conductor or current collector.

In some embodiments, the method further includes rubbing the liquid metal powder on the conductor or current collector. This can be accomplished, for example, with a rubbing cotton/rubber cloth. The rubbing action provides a uniform film of liquid metal on the current collector. Without wishing to be bound by theory, it is believed that the rubbing action provides localized heating which is used for (1) melting of the LM and spreading of the LM on the current collector; and (2) forming a thin film of oxidation product of the LM in between the current collector and LM (such an oxidation film allows the LM to spread on the current collector with much improved wettability). It should be noted that such a film cannot be formed in the absence of oxygen, such as in controlled argon/nitrogen chambers. As such, in some embodiments, the method is performed in the presence of oxygen.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by one of ordinary skill in the art, definitions are set forth to facilitate explanation of the presently-disclosed subject matter.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

Following long-standing patent law convention, the terms "a", "an", and "the" refer to "one or more" when used in this application, including the claims.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount (e.g., thickness, concentration, time, etc.) or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to practice the presently-disclosed subject matter.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The presently-disclosed subject matter is further illustrated by the following specific but non-limiting examples. The following examples may include compilations of data that are representative of data gathered at various times during the course of development and experimentation related to the present invention.

EXAMPLES

Example 1

Liquid Metal Alloys as Self-Healing Electrodes for Lithium Ion Batteries

Improving the capacity and durability of electrode materials is one of the critical challenges lithium-ion battery technology is facing presently. Several promising anode materials, such as Si, Ge, and Sn, have theoretical capacities several times larger than that of the commercially used graphite negative electrode. However, their applications are limited because of the short cycle life due to fracture caused by diffusion-induced stresses (DISs) and the large volume change during electrochemical cycling. In this example, a strategy is presented to achieve high capacity and improved durability of electrode materials using low-melting point, lithium active, liquid metals (LMs) as LIB electrodes. Gallium as a negative electrode was used as an example to show that at a temperature above the melting point of Ga, a reversible solid-liquid transition occurs upon lithiation (lithium insertion) and delithiation (lithium extraction) of Ga. This example illustrates the reversibility of lithiation of the LM pure Ga at 40° C., as a negative electrode for a LIB. Ga hosts 2 Li atoms per Ga atom upon full lithiation, delivers a theoretical gravimetric capacity of 769 mAh g$^{-1}$ by forming Li$_2$Ga alloy[41], and shows a discharge potential close to the Li/Li$^+$ reaction. It has been shown that LiGa alloys[42], CuGa alloys[43], and Ga confined in carbon matrix[44] deliver capacities of about 200-400 mAh g$^{-1}$ upon extended cycling. While the previous work was on either high temperature liquid Ga or alloying of Ga for LIB applications, the present work describe herein focuses on showing self-healing of cracks as a result of reversible liquid-to-solid phase transformation when a liquid metal electrode is used in accordance with the presently-disclosed subject matter. While a self-healing nature of gallium has been suggested, it is been concurrently explained that it is "critically important" to use "a confining porous matrix" to implement self healing.[43] Distinctly, the presently-disclosed subject matter makes use of a liquid metal without any need of a support matrix.

As illustrated by this example, the electrode and battery of the presently-disclosed subject matter allows for cracks formed in the lithiated solid state to be "healed" once the electrode returns to liquid after delithiation. This example shows that cracking as a failure mode can be remedied using liquid metal electrodes as disclosed herein.

Experimental

Commercial pure gallium (Ga) metal (99.99%, Alfa Aesar) was applied onto 0.025 mm thick 304-type stainless steel (SS) foils (Alfa Aesar) without any binder or conducting additive. The thickness of Ga film on SS substrate was controlled to be about 1 μm, and the mass of Ga was precisely measured by a microbalance (XS 205, Mettler Toledo). Samples were assembled into CR 2025-type coin cells (Hohsen) in an argon-filled glove-box (MBraun) with oxygen and moisture contents less than 0.1 ppm. Li metal foils (99.9%, Sigma Aldrich) were used as the counter electrode (CE). One piece of Celgard 3501 separator soaked in the electrolyte solution consisting of 1M LiPF$_6$ dissolved in a mixture of ethyl carbonate and dimethyl carbonate (EC/DMC, volumetric ratio 1:1) (Novolyte) was used in making the coin cells. Capillary cells were assembled with liquid gallium as the working electrode (WE) and lithium metal as the CE. Electrolyte solution was the same as for coin cells. The capillary was filled with liquid Ga from one end and solid lithium attached to a copper current collector was pushed in through the other end. The space between the electrodes was filled with the electrolyte which lengths approximately 2 mm. Copper wires were used as current conductors. Both ends of the cell were sealed with Ton-seal (Varian). Electrolyte contacting air was avoided from Torr-seal with a Teflon cap. The transparent glass body allowed direct observation of the color and texture changes in the Ga during lithiation and delithiation.

Cycling performance of coin cells was evaluated using a potentiostat (VersaSTAT 3, PAR). The cells were galvanostaticlly cycled between 2.0 V and 0.005 V at various rates. During cycling, coin cells were kept in an environmental chamber (Test Equity) with precise temperature controlled at 40, 20, and 10° C., according to the experimental needs. The temperature fluctuation is less than ±0.1° C. In this work charging refers to lithiation and discharging refers to delithiation. Electrochemical Impedance Spectrometry (EIS) was conducted using a potentiostat (2273, PAR) at 40° C. and 10° C., respectively. Before each EIS measurement, coin cells were cycled 5 times for stabilization, and then held at 0.890 V until the current was less than 10 nA. The amplitude of the ac signal applied to the electrodes was 8 mV and the frequency was varied from $10^5$ to $5\times10^{-3}$ Hz. For capillary cells, galvanostatic cycling was conducted with a current of 10 μA using a potentiostat (VersaSTAT 3, PAR).

Before characterization, the cycled cells were disassembled and the WE was washed by DMC (99%, Alfa Aesar). Ex-situ x-ray diffraction (XRD) was carried out using a D8 Discover (Bruker AXS) system with Cu Kα radiation (wavelength 1.54 nm). Samples were maintained at 40° C. during XRD tests. Scanning electron microscopy (SEM) imaging was performed using a Hitachi S-4300 with an acceleration voltage of 3 kV. A high sensitivity energy dispersive x-ray spectrometer (EDS, PGT) was used to conduct chemical analysis. The optical observations of the capillary cells were made under a model QX5 optical microscope (Prime Entertainment Company).

Results and Discussion

The melting point of pure Ga is 29° C. Electrochemical cycling tests in this work were held at 40° C. to ensure the liquid state of pure Ga. Different from the Ga—Li equilibrium phase diagram[45] and observations of Li in Ga at 415° C.[17], three intermetallic phases, $Li_2Ga_7$, LiGa, and $Li_2Ga$, form during the electrochemical reaction of Ga with Li at 40° C. The potential-capacity profile in FIG. 2 clearly shows four narrow single-phase regions, as well as two-phase regions (plateaus). The theoretical Coulombic capacity in going from Ga to $Li_2Ga$ corresponds to 769 mAh per gram of Ga. The electrode used to generate the data of FIG. 2 yielded 700 mAh/g, about 91% of the theoretical value, which indicates that the vast majority of the Ga within the electrode was utilized for reaction with Li.

Figure 3:
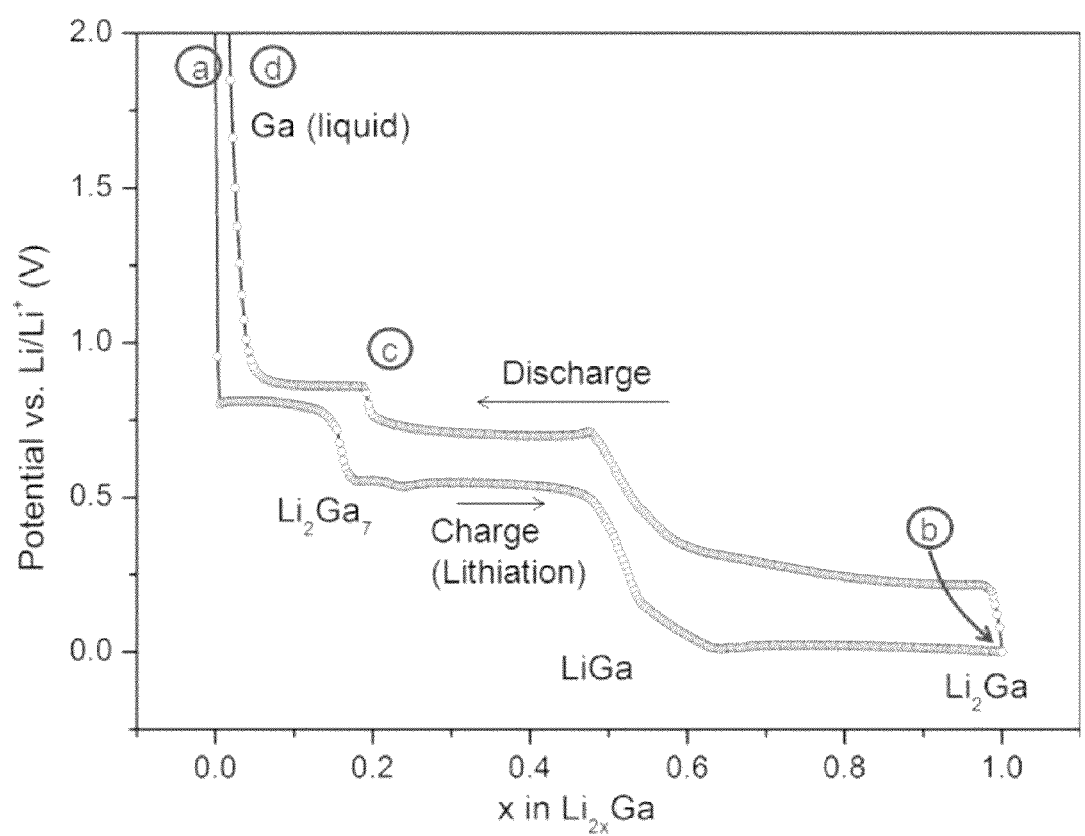
FIG. 3. Morphology changes of Ga with cycling. Figures are taken from different states of cycling depicted in FIG. 2: (a) Ga before cycling, (b) after full lithiation, (c) cracks formation in Ga—Li alloy during delithiation, and (d) cracks are self-healed by the solid-liquid transformation.

The morphology changes of Ga at various stages of cycling were examined by ex-situ SEM, as shown in FIG. 3. Before cycling, the applied Ga forms a uniform thin layer on the stainless steel substrate (FIG. 3A). After full lithiation, the alloy becomes solid and surface roughness increases (FIG. 3B). Through-thickness interconnected cracks form in the alloy primarily during delithiation (FIG. 3C). After cycling, most cracks disappear because the alloy returns to pure Ga, which is a LM at 40° C. (FIG. 3D). Thus, cracks are self-healed by the solid-to-liquid transformation of the Ga electrode.

Figure 4:
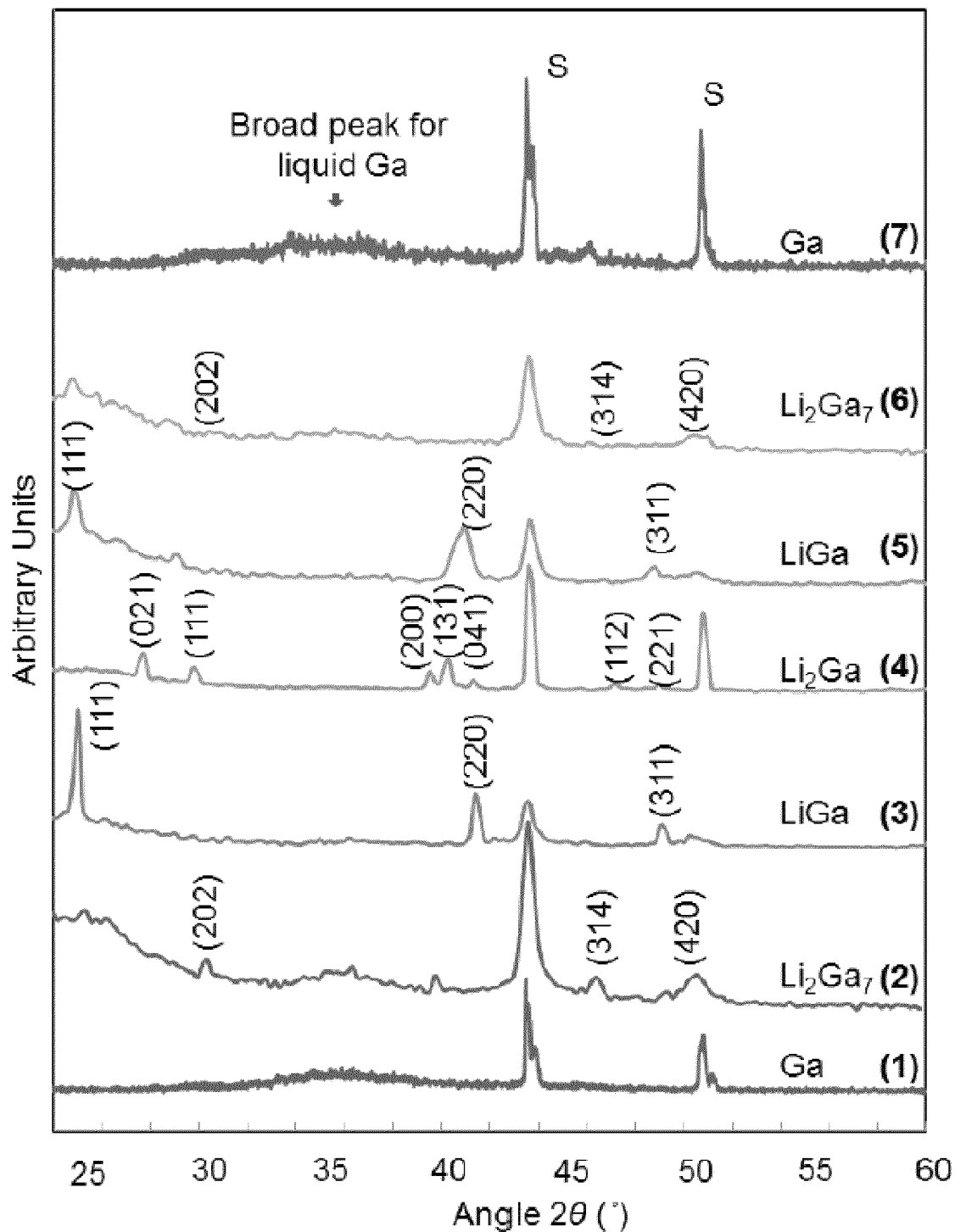
FIG. 4. Ex-situ XRD results of the Ga electrode during electrochemical cycling. The numbers (1)-(7) refer to different states of lithiation and delithiation of Ga as depicted in FIG. 1. The stainless steel substrate peaks are indicated as "S".

X-ray diffraction (XRD) of Ga at 40° C. shows that before cycling Ga is liquid, as seen by a wide bump at 2θ=36° (FIG. 4). During cycling three reversible phases, $Li_2Ga_7$, LiGa, and $Li_2Ga$, form, as seen from XRD peak identification using information as reported in ref 18 and JCPDS files (file NO. 31-0539, file NO. 09-0043), respectively. After complete delithiation, Ga returns to its liquid state, indicated by the hump at 2θ=36° in the XRD profile. Thus, a reversible liquid-solid-liquid transition in Ga is confirmed upon lithiation and delithiation, corroborating the electrochemical results.

Based on the XRD and electrochemical results, and consistent with the previous work of Saint et al.[42], the electrochemical reaction of liquid Ga with Li at 40° C. can be summarized as follows. By combining electrochemical measurements and ex situ XRD (FIGS. 1 and 3), it is shown that three intermetallic phases form in the sequence [28]:

   (1)

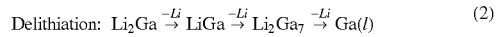   (2)

Figure 5:
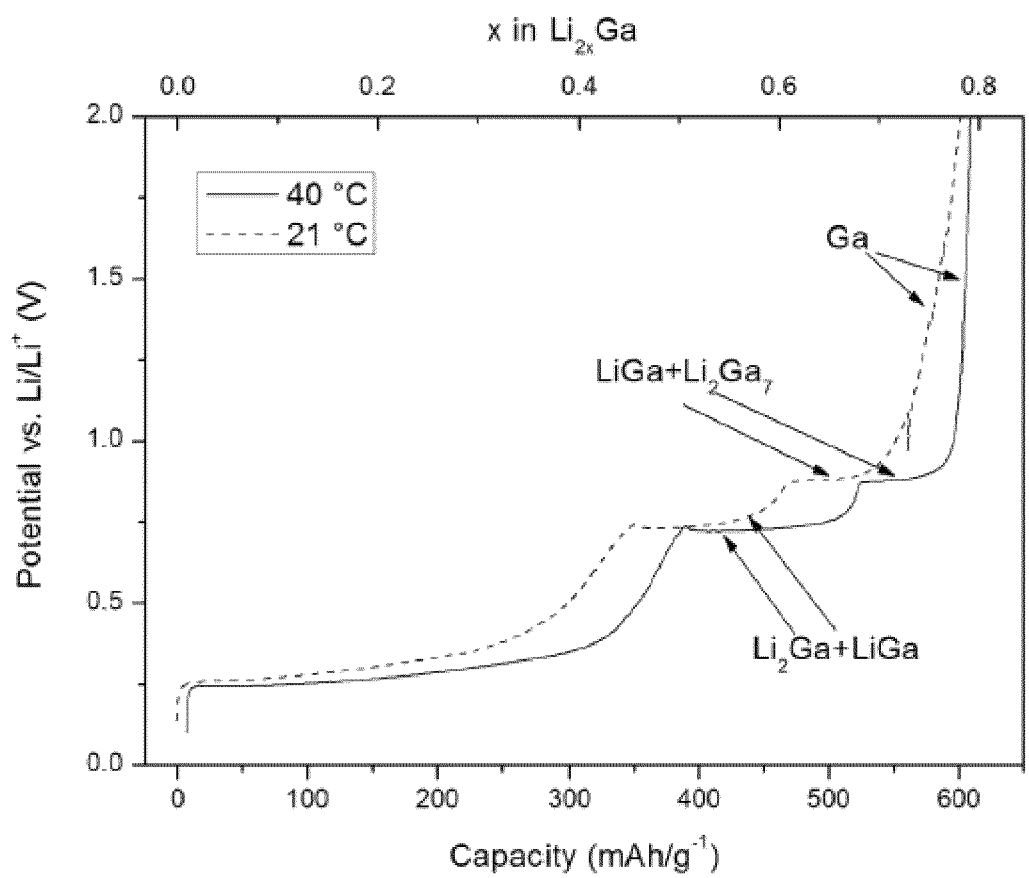
FIG. 5. Discharging voltage-capacity profiles of liquid Ga (40° C.) and solid Ga (20° C.) at C/2 rate.

To further understand the effect of a liquid electrode on the electrochemical performance, the discharging voltage-capacity profiles of (a) liquid Ga (40° C.) and (b) solid Ga (21° C.) at a C/2 rate are compared in FIG. 5. For Ga at 40° C., the $GaLi_x$ compounds are solid at this temperature. After the cell reaches the final plateau near 0.9 V, the electrode is a mixture of solid $Li_2Ga_7$ and liquid Ga. Because Li diffusion in liquid Ga is much faster than in a solid, Li diffusion in solid $Li_2Ga_7$ is rate limiting at this stage. After reaching the liquid Ga single phase (starting at about 0.95 V), most of the electrode is liquid and Li diffusion is especially fast. Thus, the cell potential increases to the upper potential limit quickly. For the case of solid Ga at 21° C., after reaching the final potential plateau, the electrode is a mixture of solid $Li_2Ga_7$ and solid Ga, where Li diffusion is relatively slow. Because of the slow diffusion, the boundary between Ga single phase region and $Li_2Ga_7$—Ga two-phase region is not clearly defined. Hence, the potential rises much more slowly for the case of solid Ga.

Figure 8:
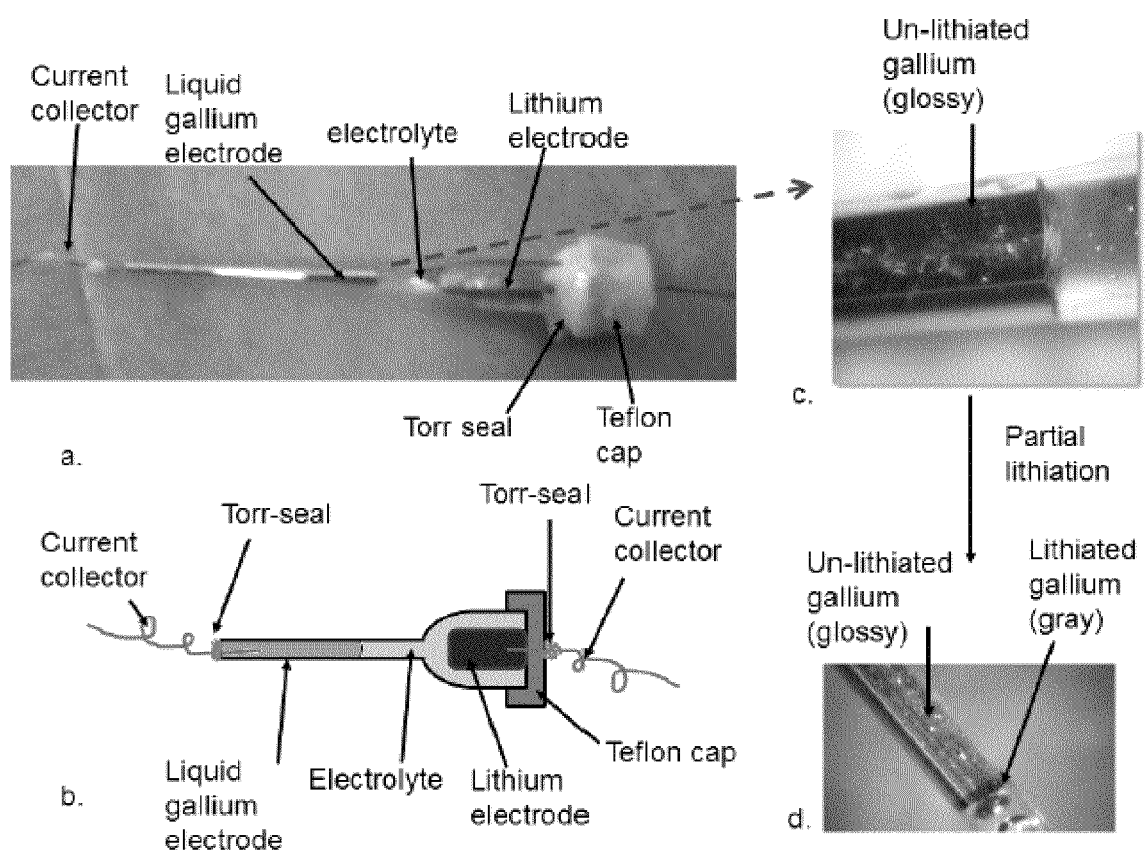
FIG. 8. (a) A capillary cell with (b) its conceptual picture. (c) Magnified view of the surface near Ga electrode before lithiation and (d) after partial lithiation. The lithiated part is gray and delithiated part is glossy.
Figure 9:
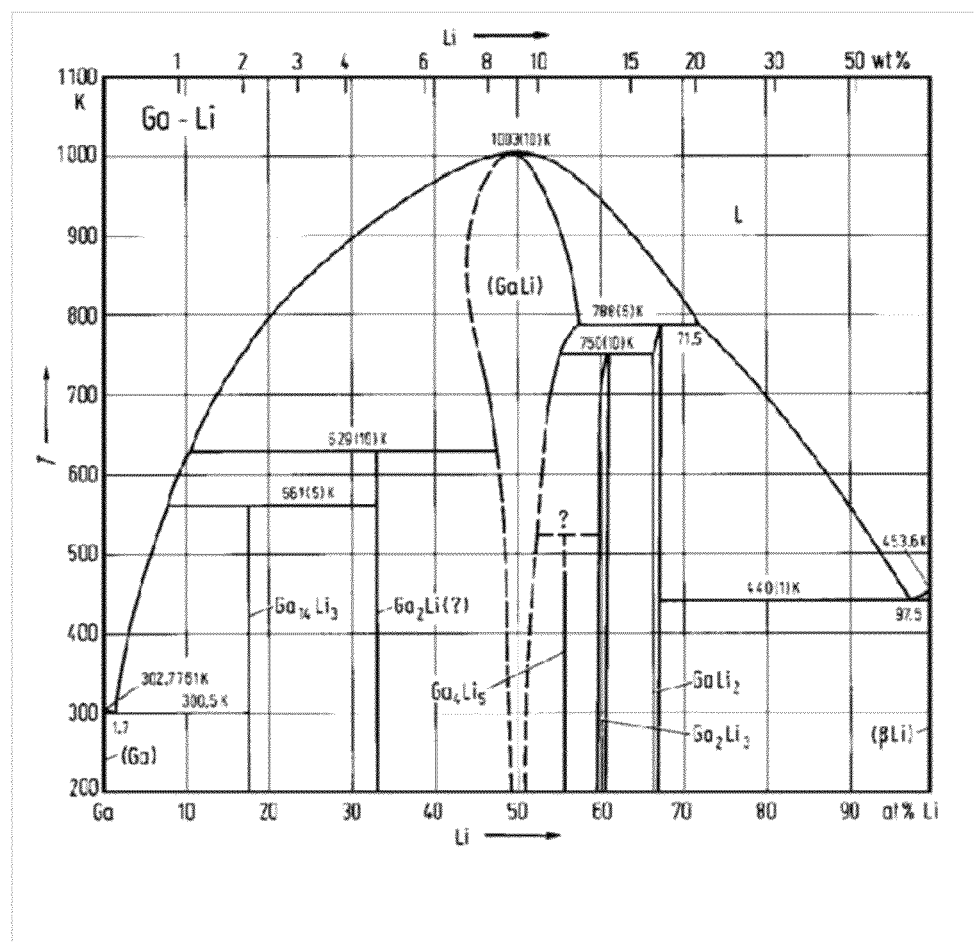
FIG. 9. Equilibrium phase diagram of Ga—Li.
Figure 10:
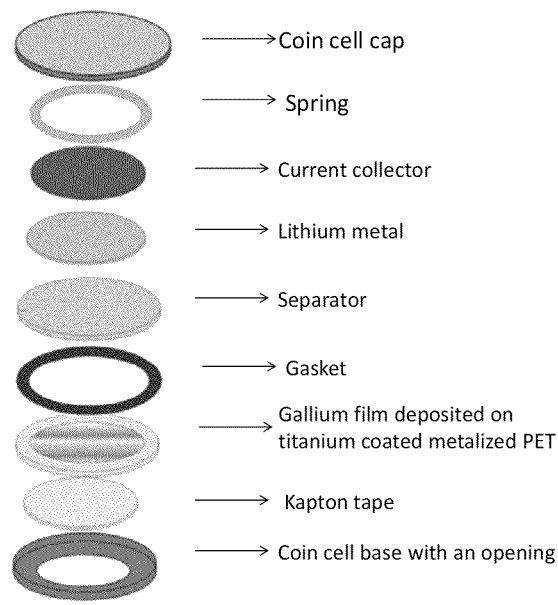
FIG. 10. Schematic of a modified coin cell for in situ XRD of liquid metal electrodes.
Figure 11:
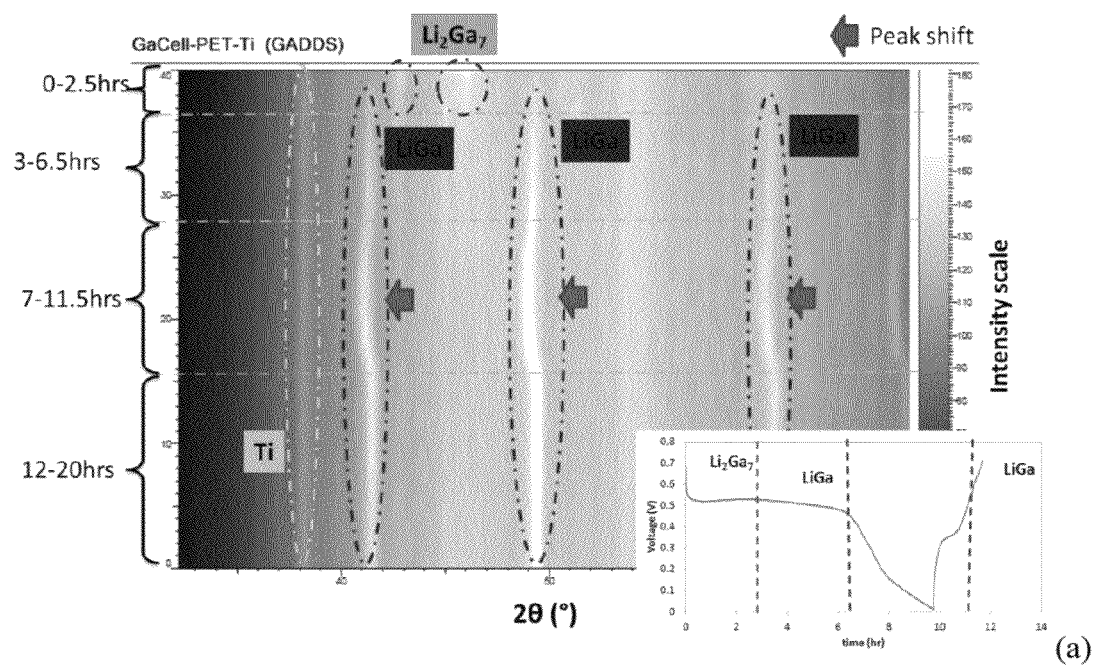
FIG. 11. In situ XRD and voltage vs. time for $Li_2Ga_7$ ⇌ LiGa.

The potential-capacity profile in FIG. 3 clearly shows four narrow single-phase regions, as well as two-phase regions (plateaus). The phases that formed were found to be a subset of the phases present in the Ga—Li equilibrium phase diagram (FIG. 9) [45] and it was observed that when Li reacts with Ga at 415° C. [41]. Electrochemical cell were also constructed for in situ XRD (FIG. 10) [46]. Using this cell, progressive shifts of the XRD peak positions of the LiGa phase were detected (FIG. 8), suggesting a finite solubility range of Li in the LiGa intermetallic phase which is consistent with the tentative phase boundaries for the LiGa phase in the equilibrium phase diagram (FIG. 9). A continuously changing voltage profile (FIG. 4) also suggests a single phase of LiGa with finite solubility.

Figure 6A:
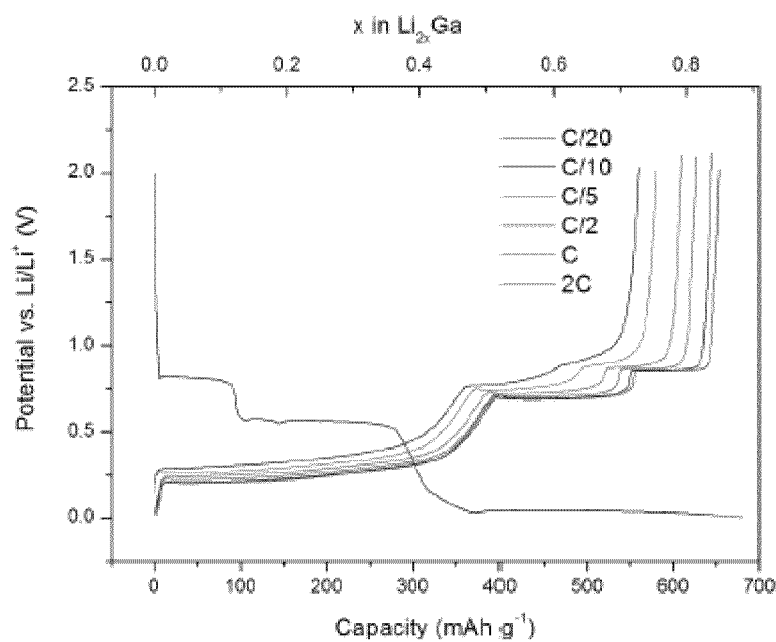
FIG. 6. Electrochemical data for the liquid Ga electrode. (a) Rate dependence of discharging voltage-capacity profiles of Ga at 40° C. The cell was charged to 0.005V at C/20 rate before each discharging. (b) Capacity versus cycle number for liquid Ga at 40° C. The charging rate was C/20, and the discharging rate was C/5.

The discharging potential-capacity profiles of Ga LM in the second cycle with various rates are compared in FIG. 6a. Before each discharging, the cells were charged at C/20 rate to ensure full lithiation of Ga. It is seen that as the discharging rate increases, the potential of each two-phase region increases slightly, which is an indication of polarization due to limited diffusivity of Li in lithiated Ga phases. The total capacity decreases with increasing discharging rate. Ga reaches a capacity of 626 mAh $g^{-1}$ at C/5 discharging rate, which is a standard rate to evaluate the performance of electrode materials. Even at a fast rate of 2 C, Ga still delivers a considerable discharge capacity of 560 mAh $g^{-1}$. The formation of LiGa delivers a capacity of 385 mAh $g^{-1}$ and that of $Li_2Ga$ delivers a capacity of 769 mAh $g^{-1}$, which is the theoretical maximum capacity of Ga.

Figure 6B:
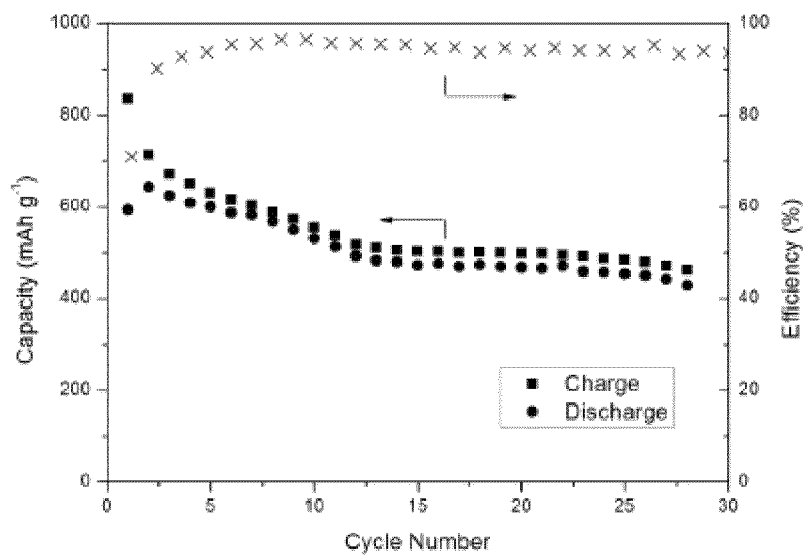

The capacity versus cycle number for liquid Ga at 40° C. is shown in FIG. 6b. Efficiency was calculated from the ratio of delithiation to lithiation in each cycle. The charging rate was C/20 and the discharging rate was C/5. A gradual decrease of capacity with cycling is apparent. Commercial lithium salt based electrolytes show fast Li diffusivity and moderate application temperature range compare to other types of electrolytes, such as ionic liquids and solid electrolytes. However, there is a drawback of SEI forming on top of electrodes when the WE is charged (lithiated) to below 0.7 V vs. the Li/Li+ reaction. The SEI consumes electrolyte, lithium, and electrode material. This SEI layer cannot be dissolved during the reversal electrochemistry process and contributes to irreversible capacity loss. For most negative materials, SEI formation completes in the first few cycles and facilitates Li transportation during subsequent cycling. In this work, because the Ga electrode is in liquid state at the beginning of charging and returns to liquid at the end of discharging at each cycle, the SEI may come off the electrode surface and is no longer stable. Thus, fresh SEI forms during every cycle and brings irreversible capacity loss. This is likely the continuous capacity drop with cycling, as indicated in FIG. 6b. To commercially apply liquid metal with low discharging potential, formation of SEI has to be avoided using other methods, such as using electrolytes that do not form SEI.

Figure 2:
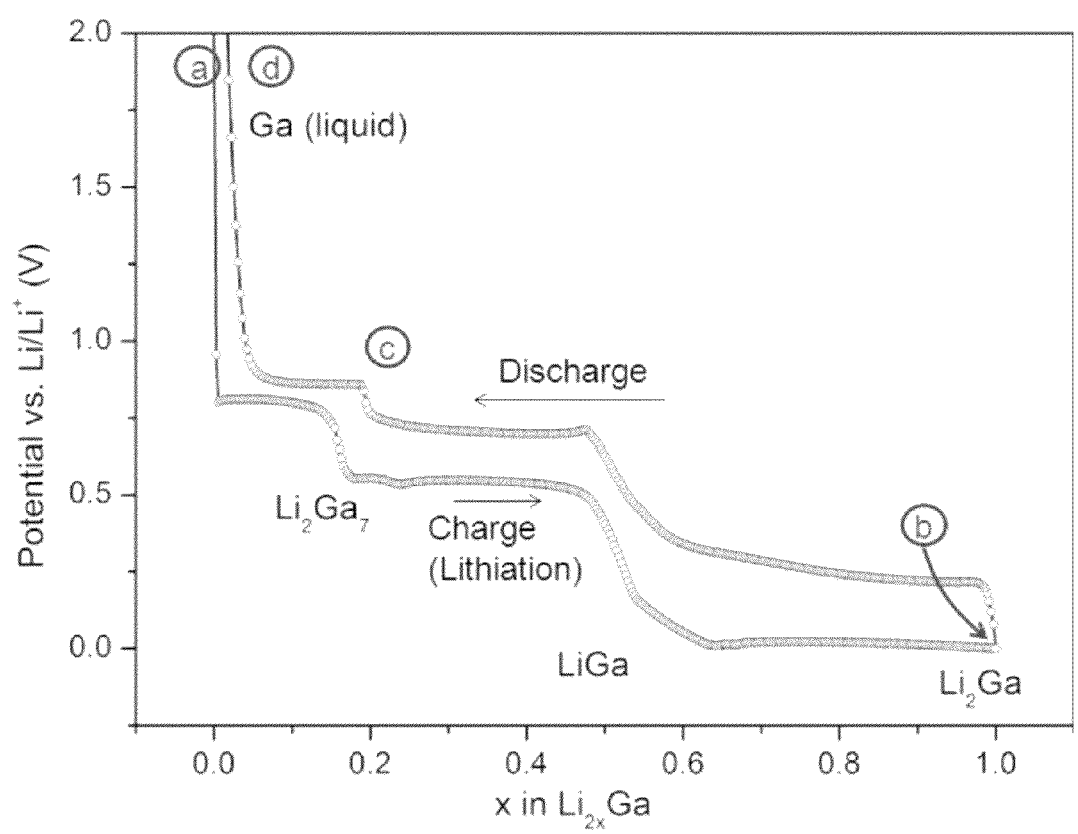
FIG. 2. Galvanostatic voltage-capacity profile of Ga at 40° C. The cycling rate was C/50. The letters a, b, c, and d correspond to different states for the SEM images of FIG. 3. The numbers (1)-(7) correspond to different states for the XRD results in FIG. 4.
Figure 7:
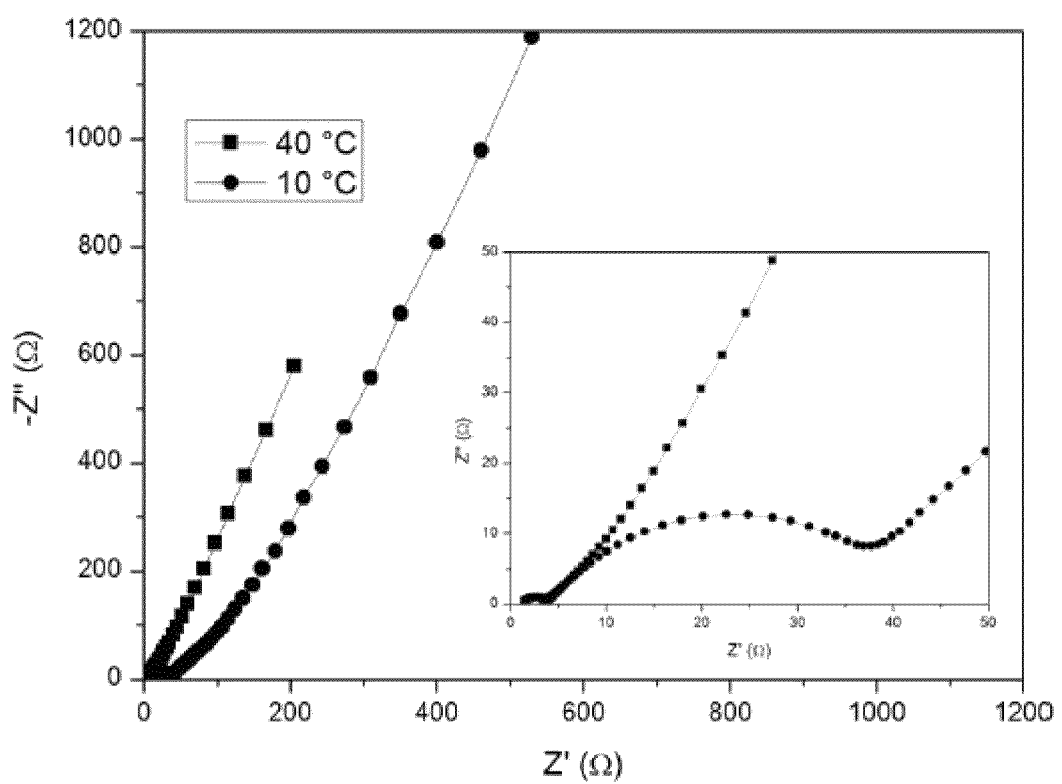
FIG. 7. Nyquist plot of EIS of liquid (40° C.) and solid (10° C.) Ga at 0.890 V vs. Li/Li$^+$. Inset shows the magnified impedance spectra at high frequency.

FIG. 7 shows the EIS measurements of Ga/Li coin cells. The measurements were conducted at 0.890 V, which is Ga single phase region (FIG. 2). Both plots are composed of a depressed semi-circle at high frequency range, a short straight line with approximately 45° at medium frequency range, and a steeper ling at high frequency range. The depressed semi-circle is attributed to SEI film and charge-transfer process, the 45° straight line is attributed to the Warburg diffusion process, which is lithium diffusion in active materials, and the steeper line is the onset of finite length diffusion. The Warburg diffusion happens at a frequency range of 125-3 Hz for 40° C., and 10-0.3 Hz for 10° C., which indicates that the charge-transfer process at high temperature is much faster. The diffusion coefficient can be calculated for the Warburg diffusion stage using[23]

$$D = \frac{1}{2}\left[\frac{V_m}{FA\sigma}\left(\frac{dE}{dx}\right)\right]^2 \quad (3)$$

where $V_m$ (cm$^3$ mol$^{-1}$) is the molar volume of liquid or solid Ga, F is Faraday constant, A is the area of WE, $\sigma$ is the linear dependence of Z' or Z" on $$w^{-\frac{1}{2}}$$

(w is the angular frequency), $$\frac{dE}{dx}$$

is the composition dependence of potential, respectively. The value of $$\frac{dE}{dx}$$

is approximately calculated from potential profile of slow cycling (C/50 rate). The diffusion coefficient of Li in liquid Ga is $1.4\times10^{-9}$ cm$^2$ s$^{-1}$ for 40° C. and is $3.7\times10^{-11}$ cm$^2$ s$^{-1}$ for solid Ga at 10° C. The two orders of magnitude difference in the diffusion coefficients consistent with the discussion of the voltage-capacity profiles in FIG. 5.

The capillary cell was observed in real time under microscope during lithiation and d-lithiation. Lithium-free liquid Ga appears glossy under the optical microscope (FIG. 8c). After partial lithiation, a distinct gray layer of lithiated Ga above the delithiated liquid Ga is observed. Delithiated liquid Ga could be still observed to be glossy as it was initially (FIG. 8d). The partially lithiated gallium was completely delithiated: the glossy liquid Ga is completely recovered. Thus, the liquid-solid-liquid transition of gallium upon lithiation and delithiation was directly observed.

Conclusion

In this example, using low-melting point metal/alloys as lithium-ion battery electrodes is shown.

A conceptual picture consistent with all of the experimental observations is given in FIG. 1 for self-healing liquid metal electrodes. The liquid metal electrode undergoes crystallization upon lithiation and transforms to a solid electrode. During delithiation the solid phases are transformed to the liquid state. Cracking forms in the electrode mostly during delithiation and can be self-healed by the solid-to-liquid transformation of the electrode during delithiation, when the electrode returns to its initial liquid state. Since many low melting point alloys exist and can be reasonably expected to store large quantities of Li, the liquid metal approach demonstrated by the liquid Ga example can be generalized to many systems of technological significance.

Example 2

Self-Healing Liquid Metal-Based Composite Electrodes

As described in Example 1, lithium-induced liquid-to-solid phase transformation using a liquid metal can be reversible. As a result, the cracks formed after lithiation of the liquid metal can be "self-healed" during de-lithiation when the electrode returns to the liquid state. Liquid-solid phase transformation can be used as a mechanism to achieve self-healing of cracks in high capacity lithium ion batteries.

The main idea is to develop composite electrodes consisting of liquid metal alloys and either a high capacity positive (cathode) or negative electrode (anode) material. When the electrode material fractures during lithiation-and-delithiation, the liquid metal will infiltrate the cracks and re-establish both electronic and lithium conduction paths. While Ga was used as an example in Example 1, the concept of self-healing electrodes will be further advanced in this example to include multicomponent liquid metal alloys (e.g., Ga—In—Sn) with a melting point as low as −19° C. From the technology development point of view, multi-component liquid metals can further suppress the melting point, thus extending the temperature range for self-healing of cracks. Furthermore, because liquid metals can also store lithium and there is no need of additional binders or conductive particles, the liquid metal/silicon composite electrodes will have both high gravimetric and volumetric energy densities, as well as self-healing capability.

The liquid-metal based composite electrodes can be made by mixing the liquid metal and other electrode materials, including new materials and conventional materials, as will be known to those of ordinary skill in the art. Examples of liquid metals are included in Table 1.

TABLE 1

| Composition (wt. %) | Melting point (° C.) |
|---|---|
| Ga | 29.8 |
| Ga$_{75}$In$_{25}$ | 15.7 |
| Ga$_{68.5}$In$_{21.5}$Sn$_{10}$ (galinstan) | −19 |

Materials that can be mixed with the liquid metal to make composite electrodes are included in Table 2.

TABLE 2

| Negative Electrode (anodes) | Positive Electrode (cathodes) |
|---|---|
| graphite, carbon, | Layer-structured cathode materials (e.g., LiCoO$_2$, Li(Ni$_{1/3}$Co$_{1/3}$Mn$_{1/3}$)O$_2$), |

TABLE 2-continued

| Negative Electrode (anodes) | Positive Electrode (cathodes) |
| --- | --- |
| carbon nanotubes, carbon nanoribbons, silicon (Si), tin (Sn), germanium (Ge), titania (TiO$_2$), aluminum (Al), tin oxides (SnO$_x$), amorphous alloys (e.g., Sn—Fe—C). | Olivine-structured cathode materials (e.g., LiFePO$_4$, LiFeSiO$_4$), Spinel-structured materials (e.g., such as LiMn$_2$O$_4$). |

Example 3

Exemplary Procedure to Fabricate Liquid Metal-Based Electrodes

Low melting point metals or alloys (LM) such as gallium do not have good wetting tendency to the possible current collectors such as stainless steel foils. It makes it difficult to have a layer of liquid metal with controlled thickness. To fabricate liquid metal electrodes with good stability the present inventors developed a 2-step process.

Step 1: Create a fine powder of the liquid metal. Cryo milling is a tool that can be used to mill the LM into fine powders. The LM is lowered to a temperature sufficient to allow for milling, which is typically below zero Celsius (e.g., 77 to 273 K). At this low temperature the LM is a brittle solid and thus can be crushed into fine powders with a milling shaft. The particle size can be controlled with the milling speed and time. Fine particles are selected using sieves and shakers for the next step.

Step 2: Film deposition. In this step, a thin layer of LM powder is put on the current collector. It is then heated to a temperature near or above the melting temperature of LM. The powder is then rubbed on the current collector with a rubbing cotton/rubber cloth. The rubbing action provides a uniform film of liquid metal on the current collector. Without wishing to be bound by theory, it is believed that the rubbing action provides localized heating which is used for (1) Melting of the LM and spreading of the LM on the current collector; and (2) Forming a thin film of oxidation product of the LM in between the current collector and LM (such an oxidation film allows the LM to spread on the current collector with much improved wettability). It should be noted that such a film cannot be formed in the absence of oxygen, such as in controlled argon/nitrogen chambers.

Throughout this document, various references are mentioned. All such references are incorporated herein by reference to the same extent as if each individual reference was specifically and individually indicated to be incorporated by reference, including the references set forth in the following list:

REFERENCES

R. A. Huggins, *Advanced Batteries—Materials Science Aspects*. (Springer, 2009).
2. G.-A. Nazri and G. Pistoia, eds. *Lithium Batteries—Science and Technology*. (Springer, 2009).
3. C. Daniel and J. O. Besenhard, eds. *Handbook of Battery Materials* 2nd ed. (Wiley-VCH, 2011).
4. B. Scrosati, "*History of lithium batteries,*" *Journal of Solid State Electrochemistry* 15(7-8), 1623-1630 (2011).
5. J. M. Tarascon and M. Armand, "*Issues and Challenges Facing Rechargeable Lithium Batteries,*" *Nature* 414(6861), 359-367 (2001).
6. M. Winter and J. O. Besenhard, "*Electrochemical Lithiation of Tin and Tin-Based Intermetallics and Composites,*" *Electrochimica Acta* 45(1-2), 31-50 (1999).
7. M. N. Obrovac, L. Christensen, D. B. Le, and J. R. Dahn, "*Alloy design for lithium-ion battery anodes,*" *Journal of The Electrochemical Society* 154(9), A849-A855 (2007).
8. J. O. Besenhard, J. Yang, and M. Winter, "*Will Advanced Lithium-Alloy Anodes Have A Chance in Lithium-Ion Batteries?,*" *Journal of Power Sources* 68(1), 87-90 (1997).
9. Y. Itou and Y. Ukyo, "*Performance of LiNiCoO$_2$ Materials for Advanced Lithium-Ion Batteries,*" *Journal of Power Sources* 146(1-2), 39-44 (2005).
10. A. Ito, D. Li, Y. Sato, M. Arao, M. Watanabe, M. Hatano, H. Horie, and Y. Ohsawa, "*Cyclic deterioration and its improvement for Li-rich layered cathode material Li[Ni0.17Li0.2Co0.07Mn0.56]O2,*" *Journal of Power Sources* 195(2), 567-573 (2010).
11. R. B. Lewis, A. Timmons, R. E. Mar, and J. R. Dahn, "*In situ AFM Measurements of the Expansion and Contraction of Amorphous Sn—Co—C Films Reacting with Lithium,*" *Journal of the Electrochemical Society* 154(3), A213-A216 (2007).
12. C. K. Chan, H. L. Peng, G. Liu, K. Mcllwrath, X. F. Zhang, R. A. Huggins, and Y. Cui, "*High-Performance Lithium Battery Anodes using Silicon Nanowires,*" *Nature Nanotechnology* 3(1), 31-35 (2008).
13. J. Graetz, C. C. Ahn, R. Yazami, and B. Fultz, "*Nanocrystalline and Thin Film Germanium Electrodes with High Lithium Capacity and High Rate Capabilities,*" *Journal of the Electrochemical Society* 151(5), A698-A702 (2004).
14. W. Wang and P. N. Kumta, "*Reversible High Capacity Nanocomposite Anodes of Si/C/SWNTs for Rechargeable Li-Ion Batteries,*" *Journal of Power Sources* 172(2), 650-658 (2007).
15. Y. T. Cheng and M. W. Verbrugge, "*The Influence of Surface Mechanics on Diffusion Induced Stresses within Spherical Nanoparticles,*" *Journal of Applied Physics* 104(8), 083521 (2008).
16. R. Deshpande, Y. T. Cheng, and M. W. Verbrugge, "*Modeling diffusion-induced stress in nanowire electrode structures,*" *Journal of Power Sources* 195(15), 5081-5088 (2010).
17. Y. T. Cheng and M. W. Verbrugge, "*Diffusion-Induced Stress, Interfacial Charge Transfer, and Criteria for Avoiding Crack Initiation of Electrode Particles,*" *Journal of the Electrochemical Society* 157(4), A508-A516 (2010).
18. Y. T. Cheng and M. W. Verbrugge, "*Application of Hasselman's Crack Propagation Model to Insertion Electrodes,*" *Electrochemical and Solid State Letters* 13(9), A128-A131 (2010).
19. R. A. Huggins and W. D. Nix, "*Decrepitation Model For Capacity Loss During Cycling of Alloys in Rechargeable Electrochemical Systems,*" *Ionics* 6, 57-63 (2000).
20. Y. Yao, M. T. McDowell, I. Ryu, H. Wu, N. A. Liu, L. B. Hu, W. D. Nix, and Y. Cui, "*Interconnected Silicon Hollow Nanospheres for Lithium-Ion Battery Anodes with Long Cycle Life,*" *Nano Letters* 11(7), 2949-2954 (2011).
21. H. Haftbaradaran, J. Song, W. A. Curtin, and H. J. Gao, "*Continuum and atomistic models of strongly coupled diffusion, stress, and solute concentration,*" *Journal of Power Sources* 196(1), 361-370.
22. K. Zhao, W. L. Wang, J. Gregoire, M. Pharr, Z. Suo, J. J. Vlassak, and E. Kaxiras, "*Lithium-Assisted Plastic Defor-* mation of Silicon Electrodes in Lithium-Ion Batteries: A First-Principles Theoretical Study," *Nano Letters* 11(7), 2962-2967 (2011).
23. X. C. Zhang, W. Shyy, and A. M. Sastry, "*Numerical Simulation of Intercalation-Induced Stress in Li-Ion Battery Electrode Particles*," *Journal of the Electrochemical Society* 154(10), A910-A916 (2007).
24. C. M. Wang, W. Xu, J. Liu, D. W. Choi, B. Arey, L. V. Saraf, J. G. Zhang, Z. G. Yang, S. Thevuthasan, D. R. Baer, and N. Salmon, "*In situ transmission electron microscopy and spectroscopy studies of interfaces in Li ion batteries: Challenges and opportunities*," *Journal of Materials Research* 25(8), 1541-1547.
25. X. H. Liu, H. Zheng, L. Zhong, S. Huan, K. Karki, L. Q. Zhang, Y. Liu, A. Kushima, W. T. Liang, J. W. Wang, J. H. Cho, E. Epstein, S. A. Dayeh, S. T. Picraux, T. Zhu, J. Li, J. P. Sullivan, J. Cumings, C. S. Wang, S. X. Mao, Z. Z. Ye, S. L. Zhang, and J. Y. Huang, "*Anisotropic Swelling and Fracture of Silicon Nanowires during Lithiation*," *Nano Letters* 11(8), 3312-3318 (2011).
26. A. Kushima, X. H. Liu, G. Zhu, Z. L. Wang, J. Y. Huang, and J. Li, "*Leapfrog Cracking and Nanoamorphization of ZnO Nanowires during In Situ Electrochemical Lithiation*," *Nano Letters* 11(11), 4535-4541 (2011).
27. R. Liu, J. Duay, and S. B. Lee, "*Heterogeneous nanostructured electrode materials for electrochemical energy storage*," *Chemical Communications* 47(5), 1384-1404 (2011).
28. R. D. Deshpande, J. C. Li, Y. T. Cheng, and M. W. Verbrugge, "*Liquid Metal Alloys as Self-Healing Negative Electrodes for Lithium Ion Batteries*," *Journal of the Electrochemical Society* 158(8), A845-A849 (2011).
29. R. N. Lyon, ed. *Liquid-Metals Handbook* 2nd ed. (Office of Naval Research, 1952).
30. S. Cheng, A. Rydberg, K. Hjort, and Z. G. Wu, "*Liquid metal stretchable unbalanced loop antenna*," *Applied Physics Letters* 94(14)(2009).
31. S. v. d. Zwaag, ed. *Self Healing Materials An Alternative Approach to 20 Centuries of Materials Science*. (Springer, 2007).
32. Y. Y. Xia, T. Sakai, T. Fujieda, M. Wada, and H. Yoshinaga, "*Flake Cu—Sn alloys as Negative Electrode Materials for Rechargeable Lithium Batteries*," *Journal of the Electrochemical Society* 148(5), A471-A481 (2001).
33. A. D. W. Todd, R. E. Mar, and J. R. Dahn, "*Tin-transition metal-carbon systems for lithium-ion battery negative electrodes*," *Journal of the Electrochemical Society* 154 (6), A597-A604 (2007).
34. J. Hassoun, S. Panero, and B. Scrosati, "*Electrodeposited Ni—Sn Intermetallic Electrodes for Advanced Lithium Ion Batteries*," *Journal of Power Sources* 160(2), 1336-1341 (2006).
35. J. Graetz, C. C. Ahn, R. Yazami, and B. Fultz, "*Highly Reversible Lithium Storage in Nanostructured Silicon*," *Electrochemical and Solid State Letters* 6(9), A194-A197 (2003).
36. H. Kim, M. Seo, M. H. Park, and J. Cho, "*A Critical Size of Silicon Nano-Anodes for Lithium Rechargeable Batteries*," *Angewandte Chemie-International Edition* 49(12), 2146-2149 (2010).
37. G. Armstrong, A. R. Armstrong, P. G. Bruce, P. Reale, and B. Scrosati, "$TiO_2(B)$ *Nanowires as An Improved Anode Material for Lithium-Ion Batteries Containing $LiFePO_4$ or $LiNi_{0.5}Mn_{1.5}O_4$ Cathodes and A Polymer Electrolyte*," *Advanced Materials* 18(19), 2597-2600 (2006).
38. H. C. Shin, J. Dong, and M. L. Liu, "*Porous Tin Oxides Prepared using an Anodic Oxidation Process*," *Advanced Materials* 16(3), 237-240 (2004).
39. S. J. Bao, Q. L. Bao, C. M. Li, and Z. L. Dong, "*Novel Porous Anatase $TiO_2$ Nanorods and their High Lithium Electroactivity*," *Electrochemistry Communications* 9(5), 1233-1238 (2007).
40. M. Winter, "*The Solid Electrolyte Interphase—The Most Important and the Least Understood Solid Electrolyte in Rechargeable Li Batteries*," *Zeitschrift Fur Physikalische Chemie-International Journal of Research in Physical Chemistry & Chemical Physics* 223(10-11), 1395-1406 (2009).
41. C. J. Wen and R. A. Huggins, "*Electrochemical Investigation of the Lithium-Gallium System*," *Journal of the Electrochemical Society* 128(8), 1636-1641 (1981).
42. J. Saint, M. Morcrette, D. Larcher, and J. M. Tarascon, "*Exploring the Li—Ga room temperature phase diagram and the electrochemical performances of the LixGay alloys vs. Li*," *Solid State Ionics* 176(1-2), 189-197 (2005).
43. K. T. Lee, Y. S. Jung, J. Y. Kwon, J. H. Kim, and S. M. Oh, "*Role of Electrochemically Driven Cu Nanograins in $CuGa_2$ Electrode*," *Chemistry of Materials* 20(2), 447-453 (2008).
44. K. T. Lee, Y. S. Jung, T. Kim, C. H. Kim, J. H. Kim, J. Y. Kwon, and S. M. Oh, "*Liquid Gallium Electrode Confined in Porous Carbon Matrix as Anode for Lithium Secondary Batteries*," *Electrochemical and Solid State Letters* 11(3), A21-A24 (2008).
45. B. Predel, *Group IV Physical Chemistry—Phase Equilibria, Crystallographic and Thermodynamic Data of Binary Alloys*. Electronic Materials and Semiconductors, ed. M. O. Vol. 5. Place (Springer, 1998).
46. R. D. Deshpande, *Understanding and improving lithium ion batteries through mathematical modeling and experiments, in PhD Thesis, Department of Chemical and Materials Engineering* 2011, University of Kentucky: Lexington, Ky.
47. G. Kresse and J. Hainer, "*ABINITIO MOLECULAR-DYNAMICS FOR LIQUID-METALS*," *Physical Review B* 47(1), 558-561 (1993).
48. http://www.anl.gov/Media_Center/News/2012/news120111.html. *Inventing self-repairing batteries*. Jan. 11, 2012.
49. B. J. Blaiszik, S. L. B. Kramer, M. E. Grady, D. A. Mcllroy, J. S. Moore, N. R. Sottos, and S. R. White, "*Autonomic Restoration of Electrical Conductivity*," *Advanced Materials* 24(3), 398-401 (2012).
50. B. Agruss, "*THE THERMALLY REGENERATIVE LIQUID-METAL CELL*," *Journal of the Electrochemical Society* 110(11), 1097-1103 (1963).
51. B. Agruss and R. Karas H, *The Thermally Regenerative Liquid Metal Concentration Cell*, in *Regenerative EMF Cells*. 1967, AMERICAN CHEMICAL SOCIETY. p. 62-81.
52. B. Agruss, Regenerative Battery, in U.S. Pat. No. 3,245, 836 (1966).
53. D. Sadoway, G. Ceder, and D. Bradwell, HIGH-AMPERAGE ENERGY STORAGE DEVICE AND METHOD in United States Patent Application 20080044725 (2008).
54. D. J. Bradwell, H. Kim, A. H. C. Sirk, and D. R. Sadoway, "*Magnesium-Antimony Liquid Metal Battery for Stationary Energy Storage*," *Journal of the American Chemical Society* 134(4), 1895-1897 (2012).
55. H. Baker, ed. *ASM Handbook, Volume 3—Alloy Phase Diagrams*. (ASM International, 1992).

56. T. E. Faber, *Introduction to the Theory of Liquid Metals*. (Cambridge, 1972).
57. M. D. Dickey, R. C. Chiechi, R. J. Larsen, E. A. Weiss, D. A. Weitz, and G. M. Whitesides, "*Eutectic gallium-indium (EGaIn): A liquid metal alloy for the formation of stable structures in microchannels at room temperature,*" Advanced Functional Materials 18(7), 1097-1104 (2008).
58. M. C, "*Discussion of the potential step method for the determination of the diffusion coefficients of guest species in host materials: Part I. Influence of charge transfer kinetics and ohmic potential drop,*" Journal of Electroanalytical Chemistry 518(2), 61-83 (2002).
59. M. A. Vorotyntsev, M. D. Levi, and D. Aurbach, "*Spatially limited diffusion coupled with ohmic potential drop and/or slow interfacial exchange: a new method to determine the diffusion time constant and external resistance from potential step (PITT) experiments,*" Journal of Electroanalytical Chemistry 572(2), 299-307 (2004).
60. M. D. Levi, R. Demadrille, A. Pron, M. A. Vorotyntsev, Y. Gofer, and D. Aurbach, "*Application of a Novel Refinement Method for Accurate Determination of Chemical Diffusion Coefficients in Electroactive Materials by Potential Step Technique,*" Journal of the Electrochemical Society 152(2), E61-E67 (2005).
61. C. J. Wen, B. A. Boukamp, R. A. Huggins, and W. Weppner, "*Thermodynamic and Mass Transport Properties of "LiAl",*" Journal of the Electrochemical Society 126(12), 2258-2266 (1979).
62. M. D. Levi and D. Aurbach, "*Diffusion Coefficients of Lithium Ions during Intercalation into Graphite Derived from the Simultaneous Measurements and Modeling of Electrochemical Impedance and Potentiostatic Intermittent Titration Characteristics of Thin Graphite Electrodes,*" The Journal of Physical Chemistry B 101(23), 4641-4647 (1997).
63. M. C, "*Apparent diffusion coefficient of intercalated species measured with PITT: A simple formulation,*" Electrochimica Acta 51(15), 3102-3111 (2006).
64. D. Aurbach, "*Review of Selected Electrode-Solution Interactions which Determine the Performance of Li and Li Ion Batteries,*" Journal of Power Sources 89(2), 206-218 (2000).
65. R. Pretorius, T. K. Marais, and C. C. Theron, "*THIN-FILM COMPOUND PHASE-FORMATION SEQUENCE—AN EFFECTIVE HEAT OF FORMATION MODEL,*" Materials Science & Engineering R-Reports 10(1-2), 1-83 (1993).
66. K. N. Tu, S. R. Herd, and U. Gosele, "*METASTABILITY IN SLOW THIN-FILM REACTIONS,*" Physical Review B 43(1), 1198-1201 (1991).
67. B. X. Liu, W. L. Johnson, M. A. Nicolet, and S. S. Lau, "*STRUCTURAL DIFFERENCE RULE FOR AMORPHOUS ALLOY FORMATION BY ION MIXING,*" Applied Physics Letters 42(1), 45-47 (1983).
68. W. L. Johnson, Y. T. Cheng, M. Vanrossum, and M. A. Nicolet, "*WHEN IS THERMODYNAMICS RELEVANT TO ION-INDUCED ATOMIC REARRANGEMENTS IN METALS,*" Nuclear Instruments & Methods in Physics Research Section B-Beam Interactions with Materials and Atoms 7-8(MAR), 657-665 (1985).
69. Y. T. Cheng and W. L. Johnson, "*DISORDERED MATERIALS—A SURVEY OF AMORPHOUS SOLIDS,*" Science 235(4792), 997-1002 (1987).
70. J. Li, X. Xiao, F. Yang, M. W. Verbrugge, and Y.-T. Cheng, "*Potentiostatic Intermittent Titration Technique for Electrodes Governed by Diffusion and Interfacial Reaction,*" The Journal of Physical Chemistry C 116(1), 1472-1478 (2012).
71. J. Li, X. Xiao, F. Yang, M. W. Verbrugge, and Y.-T. Cheng, "*Potentiostatic Intermittent Titration Technique (PITT) for Spherical Particles with Finite Interfacial Kinetics,*" (submitted for publication).
72. R. Deshpande, Y. T. Cheng, M. W. Verbrugge, and A. Timmons, "*Diffusion Induced Stresses and Strain Energy in a Phase-Transforming Spherical Electrode Particle,*" Journal of the Electrochemical Society 158(6), A718-A724 (2011).
73. V. R. Subramanian and R. E. White, "*New separation of variables method for composite electrodes with galvanostatic boundary conditions,*" Journal of Power Sources 96(2), 385-395 (2001).
74. Q. Zhang and R. E. White, "*Moving Boundary Model for the Discharge of a LiCoO[sub 2] Electrode,*" Journal of the Electrochemical Society 154(6), A587-A596 (2007).
75. Y. J. Zhu and C. S. Wang, "*Galvanostatic Intermittent Titration Technique for Phase-Transformation Electrodes,*" Journal of Physical Chemistry C 114(6), 2830-2841 (2010).
76. S. S. Zhang, K. Xu, and T. R. Jow, "*EIS study on the formation of solid electrolyte,*" Electrochimica Acta 51(8-9), 1636-1640 (2006).
77. P. Knauth, "*Inorganic solid Li ion conductors: An overview,*" Solid State Ionics 180(14-16), 911-916 (2009).
78. A. Ramzy and V. Thangadurai, "*Tailor-Made Development of Fast Li Ion Conducting Garnet-Like Solid Electrolytes,*" Acs Applied Materials & Interfaces 2(2), 385-390 (2010).
79. N. Kamaya, K. Homma, Y. Yamakawa, M. Hirayama, R. Kanno, M. Yonemura, T. Kamiyama, Y. Kato, S. Hama, K. Kawamoto, and A. Mitsui, "*A lithium superionic conductor,*" Nature Materials 10(9), 682-686 (2011).
80. V. V. Godlevsky, J. J. Derby, and J. R. Chelikowsky, "*Ab initio molecular dynamics simulation of liquid CdTe and GaAs: Semiconducting versus metallic behavior,*" Physical Review Letters 81(22), 4959-4962 (1998).
81. R. V. Kulkarni and D. Stroud, "*Ab initio molecular-dynamics simulation of liquid Ga—Ge alloys,*" Physical Review B 57(17), 10476-10481 (1998).
82. R. V. Kulkarni and D. Stroud, "*Ab initio molecular-dynamics simulation of liquid $GaAs1-x$ alloys,*" Physical Review B 62(8), 4991-4998 (2000).
83. J. R. Chelikowsky, J. J. Derby, V. V. Godlevsky, M. Jain, and J. Y. Raty, "*Ab initio simulations of liquid semiconductors using the pseudopotential-density functional method,*" Journal of Physics-Condensed Matter 13(41), R817-R854 (2001).
84. G. Kresse, "*Ab initio molecular dynamics: recent progresses and limitations,*" Journal of Non-Crystalline Solids 312-14, 52-59 (2002).
85. J. M. Holender, M. J. Gillan, M. C. Payne, and A. D. Simpson, "*STATIC, DYNAMIC, AND ELECTRONIC-PROPERTIES OF LIQUID GALLIUM STUDIED BY FIRST-PRINCIPLES SIMULATION,*" Physical Review B 52(2), 967-975 (1995).
86. J. J. Yang, J. S. Tse, and T. Iitaka, "*First-principles study of liquid gallium at ambient and high pressure,*" Journal of Chemical Physics 135(4)(2011).
87. C. Y. Ouyang, S. Q. Shi, Z. X. Wang, X. J. Huang, and L. Q. Chen, "*First-principles study of Li ion diffusion in $LiFePO4$,*" Physical Review B 69(10)(2004).

88. J. Sarnthein, K. Schwarz, and P. E. Blochl, "*Ab initio molecular-dynamics study of diffusion and defects in solid Li3N,*" Physical Review B 53(14), 9084-9091 (1996).
89. T. Ikeshoji, E. Tsuchida, T. Morishita, K. Ikeda, M. Matsuo, Y. Kawazoe, and S. Orimo, "*Fast-ionic conductivity of Li(+) in LiBH(4),*" Physical Review B 83(14)(2011).
90. M. Vijayakumar, S. Kerisit, Z. G. Yang, G. L. Graff, J. Liu, J. A. Sears, S. D. Burton, K. M. Rosso, and J. Z. Hu, "*Combined (6, 7)Li NMR and Molecular Dynamics Study of Li Diffusion in Li(2)TiO(3),*" Journal of Physical Chemistry C 113(46), 20108-20116 (2009).
91. G. Kresse and D. Joubert, "*From ultrasoft pseudopotentials to the projector augmented-wave method,*" Physical Review B 59(3), 1758-1775 (1999).
92. J. P. Perdew, J. A. Chevary, S. H. Vosko, K. A. Jackson, M. R. Pederson, D. J. Singh, and C. Fiolhais, "*ATOMS, MOLECULES, SOLIDS, AND SURFACES—APPLICATIONS OF THE GENERALIZED GRADIENT APPROXIMATION FOR EXCHANGE AND CORRELATION,*" Physical Review B 46(11), 6671-6687 (1992).
93. A. M. N. Niklasson, "*Extended Born-Oppenheimer molecular dynamics,*" Physical Review Letters 100(12)(2008).
94. S. Nose, "*A UNIFIED FORMULATION OF THE CONSTANT TEMPERATURE MOLECULAR-DYNAMICS METHODS,*" Journal of Chemical Physics 81(1), 511-519 (1984).
95. R. Virkkunen, K. Laasonen, and R. M. Nieminen, "*MOLECULAR-DYNAMICS USING THE TIGHT-BINDING APPROXIMATION—APPLICATION TO LIQUID SILICON,*" Journal of Physics-Condensed Matter 3(38), 7455-7464 (1991).
96. J. C. Li, A. K. Dozier, Y. C. Li, F. Q. Yang, and Y. T. Cheng, "*Crack Pattern Formation in Thin Film Lithium-Ion Battery Electrodes,*" Journal of the Electrochemical Society 158(6), A689-A694 (2011).
97. B. B. Mandelbrot, *The Fractal Geometry of Nature*. (W. H. Freeman, 1982).
98. V. A. Sethuraman, V. Srinivasan, A. F. Bower, and P. R. Guduru, "*In Situ Measurements of Stress-Potential Coupling in Lithiated Silicon,*" Journal of the Electrochemical Society 157(11), A1253-A1261.
99. J. A. Floro, E. Chason, S. R. Lee, R. D. Twesten, R. Q. Hwang, and L. B. Freund, "*Real-time stress evolution during Si1-xGex heteroepitaxy: Dislocations, islanding, and segregation,*" Journal of Electronic Materials 26(9), 969-979 (1997).
100. J. A. Floro, S. J. Hearne, J. A. Hunter, P. Kotula, E. Chason, S. C. Seel, and C. V. Thompson, "*The dynamic competition between stress generation and relaxation mechanisms during coalescence of Volmer-Weber thin films,*" Journal of Applied Physics 89(9), 4886-4897 (2001).
101. L. B. Freund and S. Suresh, *Thin Films Mechanics*. (Cambridge University Press 2004).
102. J. C. Li, F. Q. Yang, J. Ye, and Y. T. Cheng, "*Whisker formation on a thin film tin lithium-ion battery anode,*" Journal of Power Sources 196(3), 1474-1477 (2011).
103. J. J. Chen and S. J. Bull, "*The investigation of creep of electroplated Sn and Ni—Sn coating on copper at room temperature by nanoindentation,*" Surface & Coatings Technology 203(12), 1609-1617 (2009).
104. E. G. Herbert, W. E. Tenhaeff, N. J. Dudney, and G. M. Pharr, "*Mechanical characterization of LiPON films using nanoindentation,*" Thin Solid Films 520(1), 413-418 (2011).
105. B. Hertzberg, J. Benson, and G. Yushin, "*Ex-situ depth-sensing indentation measurements of electrochemically produced Si—Li alloy films,*" Electrochemistry Communications 13(8), 818-821 (2011).
106. J. B. Ratchford, B. E. Schuster, B. A. Crawford, C. A. Lundgren, J. L. Allen, and J. Wolfenstine, "*Young's modulus of polycrystalline Li(22)Si(5),*" Journal of Power Sources 196(18), 7747-7749 (2011).
107. Y. T. Cheng and C. M. Cheng, "*Scaling, dimensional analysis, and indentation measurements,*" Materials Science & Engineering R-Reports 44(4-5), 91-149 (2004).
108. Y. T. Cheng, W. Y. Ni, and C. M. Cheng, "*Determining the instantaneous modulus of viscoelastic solids using instrumented indentation measurements,*" Journal of Materials Research 20(11), 3061-3071 (2005).
109. Y. T. Cheng and F. Q. Yang, "*Obtaining shear relaxation modulus and creep compliance of linear viscoelastic materials from instrumented indentation using axisymmetric indenters of power-law profiles,*" Journal of Materials Research 24(10), 3013-3017 (2009).
110. C. C. Tasan, J. P. M. Hoelhagels, and M. G. D. Geers, "*Indentation-based damage quantification revisited,*" Scripta Materialia 63(3), 316-319 (2010).
111. H. Li and J. Liu, "*Revolutionizing heat transport enhancement with liquid metals: Proposal of a new industry of water-free heat exchangers,*" Frontiers in Energy 5(1), 20-42 (2011).
112. R. R. Lloyd, J. L. Provis, K. J. Smeaton, and J. S. J. van Deventer, "*Spatial distribution of pores in fly ash-based inorganic polymer gels visualised by Wood's metal intrusion,*" Microporous and Mesoporous Materials 126(1-2), 32-39 (2009).
113. K. Josef, "*Pore space analysis of cement-based materials by combined Nitrogen sorption—Wood's metal impregnation and multi-cycle mercury intrusion,*" Cement and Concrete Composites 32(7), 514-522 (2010).
114. M. Knoblauch, J. M. Hibberd, J. C. Gray, and A. J. E. van Bel, "*A galinstan expansion femtosyringe for microinjection of eukaryotic organelles and prokaryotes,*" Nature Biotechnology 17(9), 906-909 (1999).
115. M. Karlsson, K. Nolkrantz, M. J. Davidson, A. Stromberg, F. Ryttsen, B. Akerman, and O. Orwar, "*Electroinjection of colloid particles and biopolymers into single unilamellar liposomes and cells for bioanalytical applications,*" Analytical Chemistry 72(23), 5857-5862 (2000).
116. S. J. Mazlouman, X. J. Jiang, A. Mahanfar, C. Menon, and R. G. Vaughan, "*A Reconfigurable Patch Antenna Using Liquid Metal Embedded in a Silicone Substrate,*" IEEE Transactions on Antennas and Propagation 59(12), 4406-4412 (2011).
117. M. Armand and J. M. Tarascon, *Nature*, 451, 652 (2008).
118. B. Laforge, L. Levan-Jodin, R. Salot and A. Billard, *Journal of the Electrochemical Society*, 155, A181 (2008).
119. Y. T. Cheng and M. W. Verbrugge, *Journal of Power Sources*, 190, 453 (2009).
120. M. W. Verbrugge and B. J. Koch, *Journal of the Electrochemical Society*, 150, A374 (2003).
121. C. J. Wen, C. Ho, B. A. Boukamp, I. D. Raistrick, W. Weppner and R. A. Higgins, *International Metals Reviews*, 5, 253 (1981).

What is claimed is:

1. A battery, comprising:
a first electrode, and
a composite electrode comprising
a liquid metal that transforms from a liquid to a solid during lithiation and from a solid to a liquid during delithiation, allowing cracks occurring in the composite electrode to fill during delithiation and to be healed during lithiation, and an additional electrode material selected from: graphite, carbon, carbon nanotubes, carbon nanoribbons, silicon (Si), germanium (Ge), titania ($TiO_2$), aluminum (Al), tin oxides, $LiCoO_2$, $Li(Ni_{1/3}Co_{1/3}Mn_{1/3})O_2$ $LiFePO_4$, $LiFeSiO_4$ and $LiMn_2O_4$.

2. The battery of claim 1, wherein the additional electrode material is silicon.

3. The battery of claim 1, wherein the additional electrode material is selected from $LiCoO_2$, $Li(Ni_{1/3}Co_{1/3}Mn_{1/3})O_2$, $LiFePO_4$, $LiFeSiO_4$, and $LiMn_2O_4$.

4. The battery of claim 1, wherein the liquid metal is provided in a film on a conductor.

5. The battery of claim 4, wherein the film has a thickness of 100 nm to 100 μm.

6. The battery of claim 4, wherein the film has a thickness of 20 μm to 100 μm.

7. The battery of claim 1, wherein the liquid metal is provided in a container.

8. The battery of claim 7, wherein the other electrode is also provided in the container, and an electrolyte is provided in a space between the first and second electrodes.

9. The battery of claim 1, wherein the other of said electrodes is lithium metal.

10. The battery of claim 1, further comprising an electrolyte.

11. A composite electrode for use in a lithium ion battery, comprising:

a layer of liquid metal mixed with an additional electrode material selected from graphite, carbon, carbon nanotubes, carbon nanoribbons, silicon (Si), germanium (Ge), titania ($TiO_2$), aluminum (Al), tin oxides, $LiCoO_2$, $Li(N_{1/3}Co_{1/3}Mn_{1/3})O_2$, $LiFePO_4$, $LiFeSiO_4$, and $LiMn_2O_4$; and a conductor, wherein the layer of liquid metal is provided on the conductor; and wherein the liquid metal transforms from a liquid to a solid during lithiation, and wherein the liquid metal transforms from a solid to a liquid during delithiation, allowing cracks occurring in the one of said electrodes to fill during delithiation and to be healed during lithiation.

12. The electrode of claim 11, wherein the liquid metal is selected from: Ga, $Ga_{75}In_{25}$, and $Ga_{68.5}In_{21.5}Sn_{10}$.

13. The electrode of claim 11, wherein the conductor is stainless steel.

14. The electrode of claim 11, wherein the liquid metal is provided in a film on the conductor, wherein the film has a thickness of 100 nm to 100 μm.

* * * * *